US012062167B1

(12) United States Patent
Jiang et al.

(10) Patent No.: US 12,062,167 B1
(45) Date of Patent: Aug. 13, 2024

(54) PROBABILITY MULTIPLY-SUM STRUCTURAL DAMAGE IMAGING POSITIONING METHOD AND SYSTEM BASED ON DELAY FACTOR

(71) Applicant: SHANDONG UNIVERSITY, Shandong (CN)

(72) Inventors: Mingshun Jiang, Jinan (CN); Lingyu Sun, Jinan (CN); Shanshan Lv, Jinan (CN); Juntao Wei, Jinan (CN); Lei Zhang, Jinan (CN); Faye Zhang, Jinan (CN); Qingmei Sui, Jinan (CN); Lei Jia, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/398,665

(22) Filed: Dec. 28, 2023

(30) Foreign Application Priority Data

Mar. 27, 2023 (CN) .......................... 202310326576.6

(51) Int. Cl.
*G06T 7/77* (2017.01)
*G06K 9/00* (2022.01)
(Continued)

(52) U.S. Cl.
CPC ................ *G06T 7/001* (2013.01); *G06T 5/20* (2013.01); *G06T 5/70* (2024.01); *G06T 7/74* (2017.01);
(Continued)

(58) Field of Classification Search
None
See application file for complete search history.

(56) References Cited

U.S. PATENT DOCUMENTS 6,360,609 B1 * 3/2002 Wooh .................... G01N 29/50
73/602
9,964,521 B2 * 5/2018 Chiou ....................... B64F 5/60
(Continued)

FOREIGN PATENT DOCUMENTS

CN 103957216 A 7/2014
CN 108334704 A 7/2018
(Continued)

OTHER PUBLICATIONS

Aug. 25, 2023 Office Action issued in Chinese Patent Application No. 202310326576.6.
(Continued)

*Primary Examiner* — Randolph I Chu
(74) *Attorney, Agent, or Firm* — Oliff PLC

(57) ABSTRACT

A probability multiply-sum structural damage imaging positioning method and system based on a delay factor includes obtaining optimal excitation frequency and group-velocity theoretical correction function based on numerical simulation of composite laminates; based on optimal excitation frequency, obtaining ultrasonic guided wave response signals of composite laminates in healthy and lossy states and sensor coordinates used for signal collection; performing path screening based on ultrasonic guided wave response signals; obtaining group-velocity correction function based on measured group velocity obtained based on ultrasonic guided wave response signal in healthy state, and calculating actual delay time based on obtained effective path, group-velocity correction function, and sensor coordinates; obtaining damage delay factor based on actual and reference delay time; forming path probability distribution based on damage delay factor, and performing path probability multiply-sum operation to obtain structural damage imaging result; and (Continued)

obtaining structural damage positioning result based on peak point coordinates of imaging result.

10 Claims, 3 Drawing Sheets

(51) Int. Cl.
*G06T 5/20* (2006.01)
*G06T 5/70* (2024.01)
*G06T 7/00* (2017.01)
*G06T 7/73* (2017.01)

(52) U.S. Cl.
CPC ...... *G06T 7/77* (2017.01); *G06T 2207/10132* (2013.01); *G06T 2207/20076* (2013.01); *G06T 2207/30108* (2013.01)

(56) References Cited

U.S. PATENT DOCUMENTS

| | | | | |
|---|---|---|---|---|
| 2016/0282308 | A1* | 9/2016 | Mofakhami | B64D 45/00 |
| 2018/0340858 | A1* | 11/2018 | Jahanbin | G01N 29/11 |
| 2021/0132004 | A1* | 5/2021 | Lepage | G01S 15/8915 |
| 2021/0293947 | A1* | 9/2021 | Stoev | G01N 33/2045 |
| 2023/0061816 | A1 | 3/2023 | Shi et al. | |
| 2023/0366870 | A1* | 11/2023 | Luloff | G01B 7/12 |
| 2023/0408451 | A1* | 12/2023 | Seo | G06T 7/11 |
| 2024/0036008 | A1* | 2/2024 | Skoglund | G01N 29/32 |
| 2024/0044845 | A1* | 2/2024 | Fleck | G01N 29/46 |
| 2024/0050037 | A1* | 2/2024 | Yang | A61B 5/681 |

FOREIGN PATENT DOCUMENTS

| | | |
|---|---|---|
| CN | 111812207 A | 10/2020 |
| CN | 112687266 A | 4/2021 |
| CN | 112903953 A | 6/2021 |
| CN | 113933392 A | 1/2022 |
| CN | 113960171 A | 1/2022 |
| CN | 114184680 A | 3/2022 |
| CN | 114384152 A | 4/2022 |
| CN | 114531729 A | 5/2022 |
| WO | 2019201177 A1 | 10/2019 |
| WO | 2021036751 A1 | 3/2021 |
| WO | 2022042159 A1 | 3/2022 |

OTHER PUBLICATIONS

Liu Guoqiang et al. "Probability-based diagnostic imaging of damage identification of stiffened composite panel." Acta Materiae Compositae Sinica. vol. 35, No. 2. pp. 311-319. Published Feb. 28, 2018.

Wang Li et al. "Delay and Sum Damage Imaging Algorithm of Laminates." Science Technology and Engineering. vol. 19, No. 14. pp. 365-370. Published May 31, 2019.

C. Lou et al., "Double stage delay multiply and sum beamforming combined with full-lag spatial coherence in ultrasound imaging." IEEE 6th Int. Conf. Signal Image Process. pp. 416-420. Published Oct. 31, 2021.

A. Nokhbatolfoghahai et al., "Evaluation of the sparse reconstruction and the delay-and-sum damage imaging methods for structural health monitoring under different environmental and operational conditions." Measurement, vol. 169. pp. 312-322. Published Feb. 28, 2021.

Sep. 28, 2023 Notice of Allowance issued in Chinese Patent Application No. 202310326576.6.

* cited by examiner

PROBABILITY MULTIPLY-SUM STRUCTURAL DAMAGE IMAGING POSITIONING METHOD AND SYSTEM BASED ON DELAY FACTOR

TECHNICAL FIELD

The present disclosure pertains to the technical field of composite material damage information analysis, and in particular, to a probability multiply-sum structural damage imaging positioning method and system based on a delay factor.

BACKGROUND

The statements in this section merely provide background information related to the present disclosure and do not necessarily constitute the conventional technology.

Carbon fiber composite laminates have many advantages, such as a light weight, high strength, strong structural integrity, and desirable designability, and have bright application prospects in aerospace, rail transport, and other fields. Different from metal materials, the inside of fiber reinforced composites suffers from complex damage such as matrix cracking, delamination, debonding, and fiber fracture under periodic fatigue loading. These failure forms appear in a single or combined way, are closely related to structural materials, ply properties, and external load, and are accompanied by degradation of material residual strength and a structural bearing capacity. This brings huge potential safety hazards. Therefore, monitoring and evaluation of structural properties of composite laminates have always attracted much attention.

A structural health monitoring technology based on guided waves has shown great potential in nondestructive testing of composite laminates due to advantages of a wide detection range, desirable damage sensitivity, and available online monitoring. For an ultrasonic imaging technology, ultrasonic guided waves are excited and captured through proper design of a piezoelectric sensor network, and the ultrasonic guided waves are used as a bearing and transmission medium of damage information, and a structural damage status is intuitively reflected through feature modeling of a baseline signal and a response signal. Scholars at home and abroad have carried out a lot of researches mainly by using methods such as tomography, phased array, delay and sum, sparse reconstruction, and probabilistic diagnostic imaging. The inventor finds that the probabilistic diagnostic imaging method and the delay and sum method have attracted the most extensive attention, but there are still various problems in such schemes:

The probabilistic diagnostic imaging method is a fast damage reconstruction algorithm with strong tolerance and high stability, but an imaging capability of the algorithm is restricted by many factors: a damage factor, an elliptic space probability distribution function, a sensor network density, an elliptic scale factor, and the like. The probabilistic diagnostic imaging algorithm focuses on strengthening a damage probability of a path or a path intersection, which is inconvenient for non-path damage positioning. Therefore, a denser sensor network needs to be used to cover more damaged regions to improve imaging quality, but causes an increase in costs. In view of this, path weight distribution, a statistical model, a virtual sensing path, a corrected probability distribution function, neural networks and feature fusion, and other methods are used to improve algorithm confidence and imaging resolution. However, for a wider range of monitoring requirements, it is still difficult to obtain an accurate and stable damage detection capability only by using sparse arrays in this method.

In contrast, the delay and sum method achieves accurate imaging by constructing and accumulating back propagating elliptical damage trajectories, has a capability of quickly detecting large-area structures using sparse sensor arrays, and can effectively overcome a problem of an insufficient off-axis positioning capability of the probabilistic diagnostic imaging method. However, due to unknown modulus parameters of materials and interference of theoretical approximation errors, a deviation exists in prior knowledge, such as dispersion, a group velocity, and a time of flight, on which this method depends. This makes a reconstructed image have large flares or artifacts. Therefore, algorithm tolerance or denoising design is the basis of achieving accurate positioning.

SUMMARY

To resolve the foregoing problems, the present disclosure provides a probability multiply-sum structural damage imaging positioning method and system based on a delay factor. In the solutions, with reference to advantages of a delay and sum method and a probabilistic diagnostic imaging method, a multiply-sum imaging concept based on path imaging correlation is proposed, and a damage delay factor is used in a path probability distribution function. This effectively improves damage positioning accuracy and robustness of composite laminates.

According to a first aspect of embodiments of the present disclosure, a probability multiply-sum structural damage imaging positioning method based on a delay factor is provided, including:

obtaining an optimal excitation frequency and a group-velocity theoretical correction function based on dispersion characteristic numerical simulation of composite laminates;

based on the optimal excitation frequency, separately obtaining ultrasonic guided wave response signals of the composite laminates in healthy and lossy states and sensor coordinates used for signal collection;

performing effective path screening based on the obtained ultrasonic guided wave response signals, a calculated result of a scattering energy parameter, and a preset threshold;

obtaining, through fitting, a group-velocity correction function based on an actually measured group velocity obtained based on the ultrasonic guided wave response signal in the healthy state, and calculating an actual delay time based on an obtained effective path, the group-velocity correction function, and the sensor coordinates;

obtaining a damage delay factor based on the actual delay time and a reference delay time;

forming path probability distribution based on the damage delay factor, and performing a path probability multiply-sum operation to obtain a structural damage imaging result; and obtaining a structural damage positioning result based on peak point coordinates of the imaging result.

Further, the obtaining a damage delay factor based on the actual delay time and a reference delay time is specifically obtaining a ratio of a difference between the actual delay time and the reference delay time to the reference delay time.

Further, the performing a path probability multiply-sum operation to obtain a structural damage imaging result is specifically:

$$y_{MSPDI} = \sum_{i=1}^{N-1} \sum_{j=i+1}^{N} p_{ij}(\tau_d)$$

$$p_{ij}(\tau_d) = \text{sign}(p_i(\tau_d)p_j(\tau_d)) \Box \sqrt{|p_i(\tau_d)p_j(\tau_d)|};$$

wherein N is a quantity of paths, $\tau_d$ is the damage delay factor, $p_i(\tau_d)$ is a path probability distribution function with the damage delay factor used and is specifically a product of a weighting factor and a probability distribution function, and i and j are an $i^{th}$ path and a $j^{th}$ path, respectively; and for the $i^{th}$ path, the probability distribution function $W_i(x, y)$ is specifically:

$$W_i(x, y) = \begin{cases} 1 - \frac{1}{\beta} \cdot \tau_{di}, & \tau_{di} < \beta \\ 0 & \tau_{di} \geq \beta \end{cases},$$

wherein $\beta$ is a constant and is a form factor of probabilistic diagnostic imaging, and $\tau_{di}$ is a damage delay factor of the i path.

Further, to avoid imaging artifacts existing in a one-time probability multiply-sum operation, a second-order probability multiply-sum operation is performed on the path probability multiply-sum operation to obtain a structural damage imaging result.

Further, the separately obtaining ultrasonic guided wave response signals of the composite laminates in healthy and lossy states and sensor coordinates used for signal collection is specifically: building an ultrasonic guided wave detection system including an annular sensor array on the to-be-detected composite laminates, and separately obtaining the ultrasonic guided wave response signals of the composite laminates in the healthy and lossy states in a polling excitation mode based on the optimal excitation frequency.

Further, a corresponding repair policy is carried out based on the structural damage positioning result and a damage degree, where the repair policy includes: taking filing or strengthening repair measures for slight damage, or taking measures of replacing a corresponding component for serious damage.

According to a second aspect of embodiments of the present disclosure, a probability multiply-sum structural damage imaging positioning system based on a delay factor is provided, including:

a numerical simulation unit, configured to obtain an optimal excitation frequency and a group-velocity theoretical correction function based on dispersion characteristic numerical simulation of composite laminates;

a data obtaining unit, configured to: based on the optimal excitation frequency, separately obtain ultrasonic guided wave response signals of the composite laminates in healthy and lossy states and sensor coordinates used for signal collection;

an effective path screening unit, configured to perform effective path screening based on the obtained ultrasonic guided wave response signals, a calculated result of a scattering energy parameter, and a preset threshold;

a damage delay factor obtaining unit, configured to: obtain, through fitting, a group-velocity correction function based on an actually measured group velocity obtained based on the ultrasonic guided wave response signal in the healthy state, calculate an actual delay time based on an obtained effective path, the group-velocity correction function, and the sensor coordinates, and obtain a damage delay factor based on the actual delay time and a reference delay time;

a damage imaging unit, configured to: form path probability distribution based on the damage delay factor, and perform a path probability multiply-sum operation to obtain a structural damage imaging result; and a damage positioning unit, configured to obtain a structural damage positioning result based on peak point coordinates of the imaging result.

According to a third aspect of embodiments of the present disclosure, an electronic device is provided, including a memory, a processor, and a running computer program stored in the memory. When the processor executes the program, the probability multiply-sum structural damage imaging positioning method based on the delay factor is implemented.

According to a fourth aspect of embodiments of the present disclosure, a non-transitory computer-readable storage medium is provided. The medium stores a computer program, and when a processor executes the program, the probability multiply-sum structural damage imaging positioning method based on the delay factor is implemented.

Compared with the conventional technology, the present disclosure has the following beneficial effects:

The present disclosure provides a probability multiply-sum structural damage imaging positioning method and system based on a delay factor. In the solutions, a concept of a damage delay is used in a conventional probability distribution definition, to form annular damage probability distribution based on a wave packet time-domain translation obtained through back propagation. This operation improves off-axis positioning of a conventional probabilistic diagnostic imaging method by using a delay principle, and improves a tolerance capability of a delay item by using a fuzzy probability theory. In this way, a modified model of an anisotropic group velocity of composite laminates is constructed, and the delay factor is modified. This effectively ensures probability distribution accuracy.

In the solutions, path spatial coherence of damage imaging is fully considered, a new probability distribution item is constructed by using a nonlinear coupling multiplication operation of two path probability distribution, and a higher-order mode of the algorithm is provided to ensure imaging quality. This effectively weakens artifact impact of damage-unrelated locations, suppresses an error between prior knowledge and a calculation result, improves damage detection accuracy and robustness of composite material plates, and greatly enhances an engineering application capability of this method.

Some additional advantages of the present disclosure are provided in the following descriptions, some of which are apparent in the following descriptions or are understandable through practice of the present disclosure.

BRIEF DESCRIPTION OF THE DRAWINGS

The accompanying drawings of this specification that constitute a part of the present disclosure are intended for further understanding of the present disclosure. Example embodiments and descriptions thereof in the present disclosure are intended to describe the present disclosure and do not constitute any unsuitable limitation on the present disclosure.

FIG. 2(*b*) is a schematic diagram of (a phase velocity-fluctuation period) dispersion curve according to an embodiment of the present disclosure;

DETAILED DESCRIPTION

Figure 1:
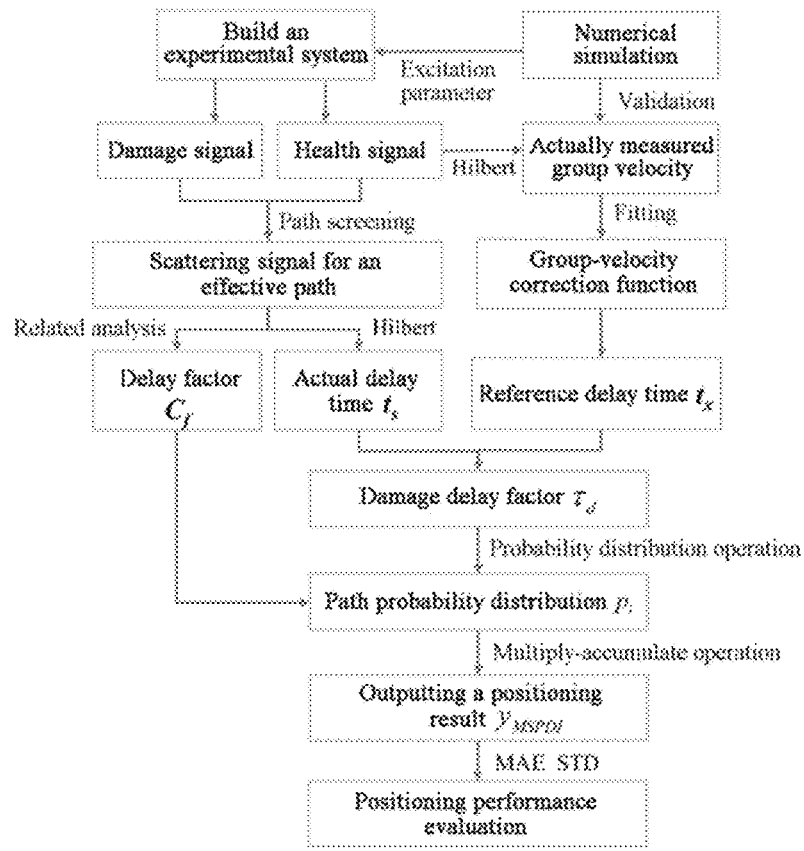
FIG. 1 is a flowchart of a probability multiply-sum structural damage imaging positioning method based on a delay factor according to an embodiment of the present disclosure.

The following describes the present disclosure in more detail with reference to accompanying drawings and embodiments.

It should be noted that the following detailed descriptions are illustrative and are intended to provide further descriptions of the present disclosure. Unless otherwise specified, all technical and scientific terms used in this specification have same meanings as those usually understood by a person of ordinary skill in the art of the present disclosure.

It should be noted that terminologies used herein are merely intended to describe specific implementations and are not intended to limit example implementations according to the present disclosure. As used herein, a singular form is also intended to encompass a plural form unless otherwise specified in a context. In addition, it should also be understood that when terms "comprising" and/or "including" are used in this specification, the terms indicate presence of features, steps, operations, devices, components, and/or combinations thereof.

Embodiments of the present disclosure and features in embodiments may be combined with each other without conflicts.

Embodiment 1

This embodiment provides a probability multiply-sum structural damage imaging positioning method based on a delay factor.

The probability multiply-sum structural damage imaging positioning method based on the delay factor includes:
obtaining an optimal excitation frequency and a group-velocity theoretical correction function based on dispersion characteristic numerical simulation of composite laminates;
based on the optimal excitation frequency, separately obtaining ultrasonic guided wave response signals of the composite laminates in healthy and lossy states and sensor coordinates used for signal collection;
performing effective path screening based on the obtained ultrasonic guided wave response signals, a calculated result of a scattering energy parameter, and a preset threshold;
obtaining, through fitting, a group-velocity correction function based on an actually measured group velocity obtained based on the ultrasonic guided wave response signal in the healthy state, and calculating an actual delay time based on an obtained effective path, the group-velocity correction function, and the sensor coordinates;
obtaining a damage delay factor based on the actual delay time and a reference delay time;
forming path probability distribution based on the damage delay factor, and performing a path probability multiply-sum operation to obtain a structural damage imaging result; and
obtaining a structural damage positioning result based on peak point coordinates of the imaging result.

Further, the obtaining a damage delay factor based on the actual delay time and a reference delay time is specifically obtaining a ratio of a difference between the actual delay time and the reference delay time to the reference delay time.

Further, the performing a path probability multiply-sum operation to obtain a structural damage imaging result is specifically:

$$y_{MSPDI} = \sum_{i=1}^{N-1} \sum_{j=i+1}^{N} p_{ij}(\tau_d)$$

$$p_{ij}(\tau_d) = \text{sign}(p_i(\tau_d)p_j(\tau_d)) \cdot \sqrt{|p_i(\tau_d)p_j(\tau_d)|};$$

wherein N is a quantity of paths, $\tau_d$ is the damage delay factor, $p_i(\tau_d)$ is a path probability distribution function with the damage delay factor used and is specifically a product of a weighting factor and a probability distribution function, i and j are an it path and a $j^{th}$ path, respectively, and specifically, for a sensor array including n piezoelectric sensors, $$N = \frac{n(n+1)}{2}$$

paths are formed; and
for the $i^{th}$ path, the probability distribution function $W_i(x, y)$ is specifically:

$$W_i(x, y) = \begin{cases} 1 - \frac{1}{\beta} \cdot \tau_{di}, & \tau_{di} < \beta \\ 0 & \tau_{di} \geq \beta \end{cases},$$

wherein β is a constant and is a form factor of probabilistic diagnostic imaging, and $\tau_{di}$ is a damage delay factor of the $i^{th}$ path.

Further, to avoid imaging artifacts existing in a one-time probability multiply-sum operation, a second-order probability multiply-sum operation is performed on the first-order multiply-sum path probability distribution to obtain a better damage imaging result.

Further, the separately obtaining ultrasonic guided wave response signals of the composite laminates in healthy and lossy states and sensor coordinates used for signal collection is specifically: building an ultrasonic guided wave detection system including an annular sensor array on the to-be-detected composite laminates, and separately obtaining the ultrasonic guided wave response signals of the composite laminates in the healthy and lossy states in a polling excitation mode based on the optimal excitation frequency.

Further, the polling excitation mode is specifically as follows: each sensor in the annular sensor array is used as an actuator, and remaining sensors are used as receivers to collect the ultrasonic guided wave response signals until all sensors are polled.

Further, the obtaining an optimal excitation frequency based on dispersion characteristic numerical simulation of composite laminates is specifically: performing numerical simulation based on property parameters of the composite laminates by using a dispersion calculator, to obtain a dispersion curve of guided waves, obtaining a non-dispersion range of the guided waves based on the dispersion curve, and selecting, from the non-dispersion range, a frequency with a stable velocity and energy dissipation meeting a preset requirement as the optimal excitation frequency.

Further, a corresponding repair policy is carried out based on the structural damage positioning result and a damage degree, where the repair policy includes: taking filing or strengthening repair measures for slight damage, or taking measures of replacing a corresponding component for serious damage.

Specifically, for ease of understanding, the following details the solution in this embodiment with reference to the accompanying drawings.

In view of problems existing in the conventional technology, as shown in FIG. 1, this embodiment provides a probability multiply-sum structural damage imaging positioning method based on a delay factor. The method specifically includes the following steps.

Step 1: Obtain an optimal excitation frequency and a group-velocity theoretical correction function based on dispersion characteristic numerical simulation of composite laminates.

Figure 2A:
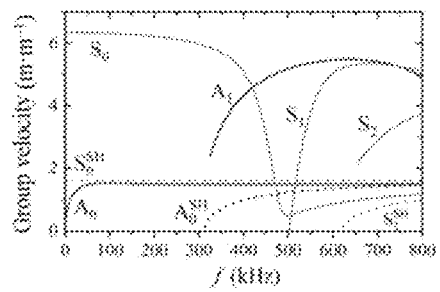
FIG. 2(*a*) is a schematic diagram of (a group velocity-fluctuation period) dispersion curve according to an embodiment of the present disclosure.
Figure 2B:
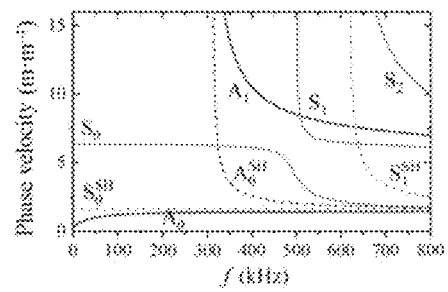

Step 1 specifically includes:
(1) Perform numerical simulation on the composite laminates based on material parameters such as an elastic modulus, a shear modulus, a Poisson's ratio, and a density by using an open-source Dispersion Calculator, and draw dispersion curves of guided waves. A composite material plate with a thickness of 2.4 mm and a layering mode of $[0°/90°]_{3s}$ is used as an example, and the dispersion curves are shown in FIG. 2.
(2) Determine a non-dispersion range (within 300 kHz) of the guided waves based on the dispersion curves, where wave packets of modalities are obviously separated from each other in this case; and select 70 kHz with a stable velocity and small energy dissipation as a center frequency of an excitation signal.
(3) Draw a full-angle group-velocity correction function $f_{simulated}(\theta)$ of an $A_0$ modality at a selected frequency for the composite material laminate, and use the correction function as a theoretical reference of group velocity correction.

Step 2: Build an experimental system, design a sensor network, and obtain, as algorithm input items, ultrasonic guided wave response signals in lossless and lossy states and sensor coordinates.

Figure 3:
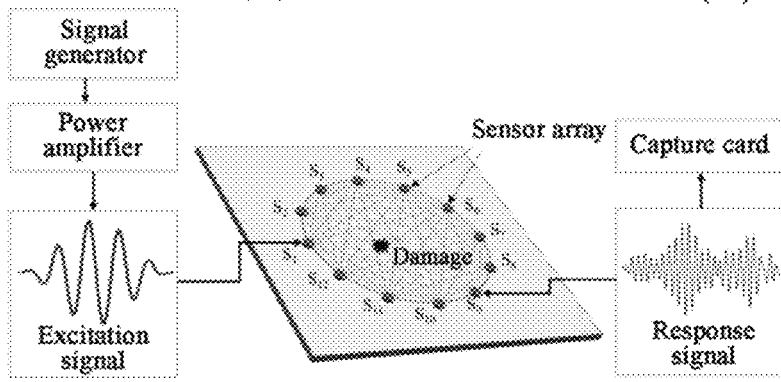
FIG. 3 is a schematic diagram of a structure of an ultrasonic guided wave detection system according to an embodiment of the present disclosure.

Step 2 specifically includes:
(1) Build an ultrasonic guided wave detection system, as shown in FIG. 3. The system includes a tested piece, a piezoelectric transducer, a signal generator, a power amplifier, and a capture card. A composite material plate with a size of 800 mm×800 mm×2.4 mm and a layering mode of $[0°/90°]_{3s}$ is used as an example for validation. Twelve piezoelectric transducers, named $S_1$-$S_{12}$, are bonded to the composite material plate by using epoxy resin adhesives, to form an annular sensor array with a diameter of 500 mm.
(2) Collect the ultrasonic guided wave response signal in the healthy state. The excitation signal is a 5-period sinusoidal modulating signal. A polling excitation mode is used to perform polling excitation on lamb signals for $S_1$-$S_{12}$ locations on the lossless plate and receive response signals. The response signals are denoted as health signals $b_i$.
(3) Collect the ultrasonic guided wave response signal in the lossy state. Spherical damping soil is used to simulate damage at different locations, and the same excitation mode is used to perform polling excitation and receive ultrasonic guided wave response signals. The response signals are denoted as damage signals $c_i$.

Step 3: Calculate a scattering energy accumulation parameter to perform effective path screening, obtain a group-velocity correction function, and define a modified damage delay factor. All paths are used during group velocity correction, and a filtered path is used during calculation of a delay time. Specific steps are as follows.

(1) Effective Path Optimization

A path that comes near to damage usually presents stronger and more stable damage information and is referred to as an effective path, and a scattering energy parameter $E_0$ and a threshold $\alpha$ are defined to perform effective path screening, as shown in the following formulas:

$$E_i = \frac{\text{Energy}(c_i - b_i)}{\text{Energy}(b_i)} \qquad (1)$$

$$E_{oi} = \frac{E_i - E_{min}}{E_{max} - E_{min}} \geq \alpha \qquad (2)$$

(2) Calculation of a Delay Time

Figure 4:
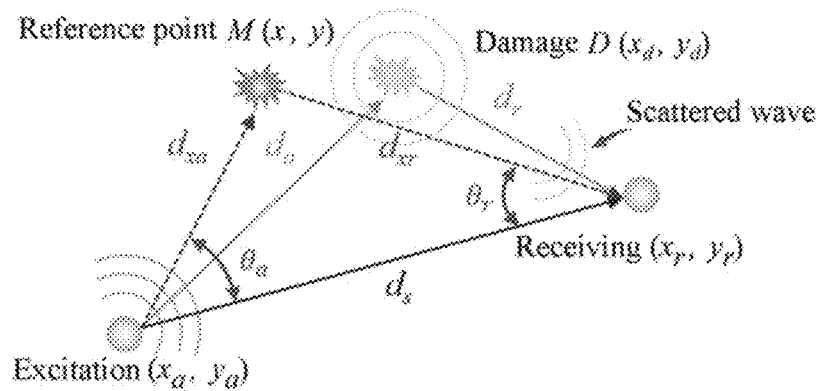
FIG. 4 is a schematic diagram of a back propagation principle according to an embodiment of the present disclosure.

As regards a damage point D $(x_d, y_d)$ in an anisotropic material, an $i^{th}$ path, a principle of performing back propagation on the guided waves from an actuator $A(x_{oi}, y_{oi})$ to a receiver $R(x_{ri}, y_{ri})$ through any reference point M $(x, y)$ in a plane is shown in FIG. 4, and the delay time $t_{si}$ may be calculated as follows:

$$t_{xi} = \frac{\sqrt{(x-x_{ai})^2 + (y-y_{ai})^2}}{c_{ga}} + \frac{\sqrt{(x-x_{ri})^2 + (y-y_{ri})^2}}{c_{gr}} \qquad (3)$$

$$c_{ga} = f(\theta_a), \theta_a = \arctan\left(\frac{y-y_{ai}}{x-x_{ai}}\right) \qquad (4)$$

$$c_{gr} = f(\theta_r), \theta_r = \arctan\left(\frac{y_{ri}-y}{x_{ri}-x}\right), \qquad (5)$$

wherein $c_{ga}$ and $c_{gr}$ are respectively propagation velocities of the guided waves from the actuator to the point M and the guided waves from the point M to the receiver, $\theta_r$ is a group-velocity correction function, the group-velocity correction function is denoted by $f(\theta)$, and a group velocity from the point M to the receiver is solved when $\theta=\theta_r$.

(3) Calculation of a Group-Velocity Correction Function

A wave packet peak time $t_ph$ and an excitation signal peak time to of an $A_0$ modality of the health signal are obtained through Hilbert transform, a difference between the two values is calculated to obtain a time of flight $t_h$ of the $A_0$ modality of the health signal, and an anisotropic propagation velocity of the guided waves is obtained based on a distance $d_s$ between an actuator and an initial sensor on the path by using the following formula:

$$c_g = \frac{d_s}{t_h}; \tag{6}$$

and fitting is performed on actually measured velocities of N paths by angle to obtain the group-velocity correction function $f(\theta)$, and comparative validation is performed between $f(\theta)$ and a simulated $f_{simulated}(\theta)$.

The simulated group-velocity correction function is only used for validation. The simulated group-velocity correction function and the experimental group-velocity correction function are compared, and if there is a small difference between the two correction functions, it indicates that the obtained group-velocity correction function is correct.

(4) Definition of a Modified Damage Delay Factor

For the $i^{th}$ path, a modified damage delay factor is defined as a parameter $\tau_{di}$ to measure a damage existence probability. The smaller $\tau_{di}$, the closer an actual damage point is to the point M, and the higher a possibility that damage exists at the point M is. The larger $\tau_{di}$, the lower a possibility that damage exists at the point M is. $\tau_{di}$ is expressed as follows:

$$\tau_{di} = \left| \frac{t_{xi} - t_{si}}{t_{si}} \right|, \tag{7}$$

where $t_{si}$ is a time of flight of a scattering signal and is obtained by calculating a difference between a wave packet peak time $t_{psi}$ of an $A_0$ modality of the scattering signal and the excitation signal peak time to.

Step 4: Form path probability distribution based on the modified damage delay factor, perform a path probability multiply-sum operation, and optimize a multiply-sum order.

Step 4 specifically includes:

(1) Forming a path probability distribution function based on the modified damage delay factor For the $i^{th}$ path, damage probability distribution at any reference point M (x, y) in a grid is obtained as follows:

$$p_i(x,y) = C_\beta \square W_i(x,y) \tag{8},$$

wherein $W_i(x, y)$ is a probability distribution function, and $C_{fi}$ is a weighting factor, is used to strengthen a damage degree of the damaged path, and is defined as follows:

$$C_{fi} = 1 - \rho(b_i, c_i) \tag{9},$$

wherein $\rho(b_i, c_i)$ is a coefficient related to a baseline signal and a damage signal of the $i^{th}$ path and is defined as follows:

$$\rho(b_i, c_i) = \frac{\text{Cov}(b_i, c_i)}{\sigma_{bi}\sigma_{ci}} = \frac{\sum_{k=1}^{K}(b_{ik} - \bar{b}_i)(c_{ik} - \bar{c}_i)}{\sqrt{\sum_{k=1}^{K}(b_{ik} - \bar{b}_i)^2 \sum_{k=1}^{K}(c_{ik} - \bar{c}_i)^2}}, \tag{10}$$

wherein $\text{Cov}(b_i, c_i)$ is a covariance between the health signal $b_i$ and the damage signal $c_i$ of the $i^{th}$ path, $\sigma_{bi}$ and $\sigma_{ci}$ are standard deviations of $b_i$ and $c_i$, $\bar{b}_i$ and $\bar{c}_i$ are average values of $b_i$ and $c_i$, k is a sequence number of a discrete point, and K is a quantity of sampling points.

Figure 5:
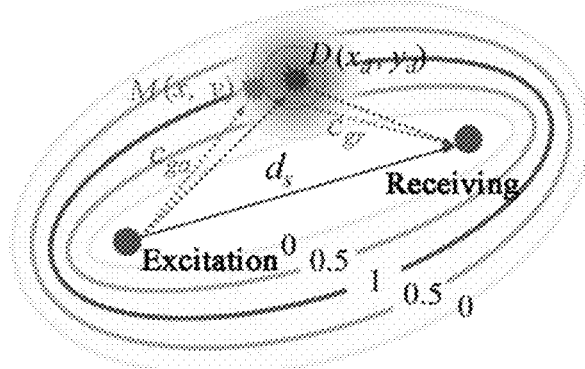
FIG. 5 is a schematic diagram in which a damage delay factor is used according to an embodiment of the present disclosure.

As shown in FIG. 5, the damage delay factor $\tau_{di}$ is used in the damage probability distribution function, and an expression is:

$$W_i(x, y) = \begin{cases} 1 - \frac{1}{\beta} \cdot \tau_{di}, & \tau_{di} < \beta \\ 0 & \tau_{di} \geq \beta \end{cases} \tag{11}$$

(2) Performing a Probability Multiply-Sum Operation

Figure 6:
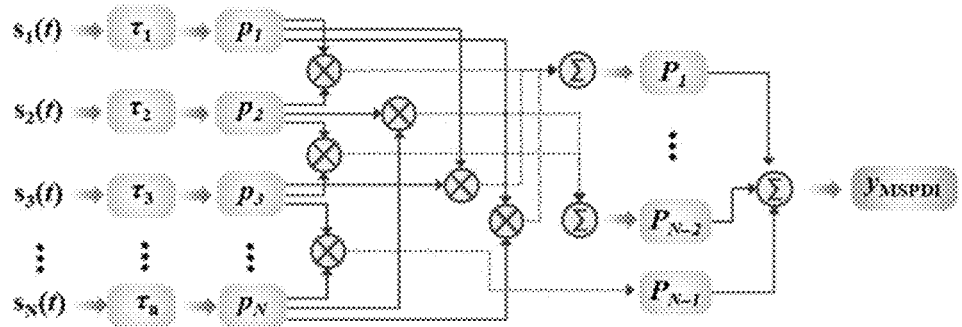
FIG. 6 is a schematic flowchart of a probability multiply-sum operation according to an embodiment of the present disclosure.

Compared with a conventional probabilistic diagnostic imaging method, a nonlinear multiplication operation in the probability multiply-sum method can be interpreted as an aperture autocorrelation function, and has stronger robustness to outliers and noise. A procedure for the probability multiply-sum operation is shown in FIG. 6, and can be expressed as the following formula:

$$y_{MSPDI} = \sum_{i=1}^{N-1} \sum_{j=i+1}^{N} p_{ij}(\tau_d) \tag{12}$$

in the formula, $\square$ $$p_{ij}(\tau_d) = \text{sign}(p_i(\tau_d)p_j(\tau_d))\sqrt{|p_i(\tau_d)p_j(\tau_d)|} \tag{13},$$

wherein $p_i(\tau_d)$ and $p_j(\tau_d)$ are weighted probability distribution functions of the i path and the $j^{th}$ path, and the formula (12) can be expanded as follows:

$$y_{MSPDI} = \frac{p_1 \square (p_2 + p_3 + p_4 + \ldots + p_{N-1} + p_N)}{P_1} + \tag{14}$$

$$\frac{p_2 \square (p_3 + p_4 + \ldots + p_{N-1} + p_N)}{P_2} + \ldots + \frac{p_{N-2} \square (p_{N-1} + p_N)}{P_{N-2}} + \frac{p_{N-1} \square p_N}{P_{N-1}}$$

Figure 7:
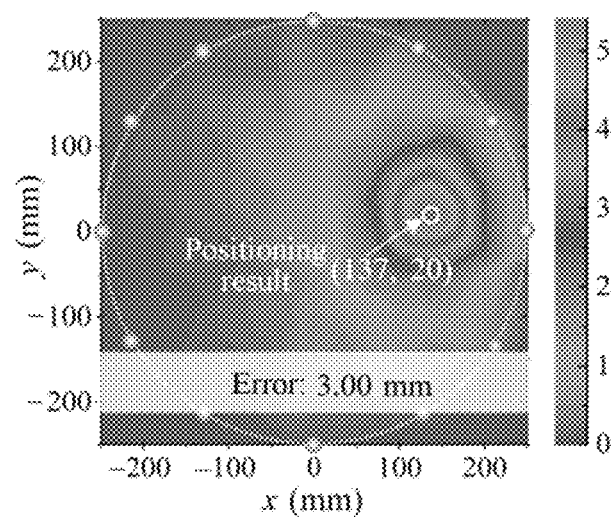
FIG. 7 is a schematic diagram of a damage imaging result according to an embodiment of the present disclosure.

$y_{MSPDI}$ is a final imaging output, and a damage imaging output for an example D (140 mm, 20 mm) is shown in FIG. 7. Each term in the formula (14) is considered as new probability distribution:

$$P_i = p_i \square \sum_{j=i+1}^{N} p_j \text{ for } 1 \leq i \leq N - 1 \tag{15}$$

(3) Optimizing a Multiply-Sum Order

For some objects, imaging artifacts still exist after a probability multiply-sum operation is performed. In this case, a second-order probability multiply-sum operation is performed on the new signal $y_{MSPDI}$, to generate a second-stage imaging output:

$$y_{DS-MSPDI} = \sum_{i=1}^{N-1} \sum_{j=i+1}^{N} P_i \square P_j \tag{16}$$

Higher-order calculation causes more workloads while improving accuracy. Therefore, requirements on a time loss and imaging accuracy need to be comprehensively considered in actual application to select an optimal order of the algorithm.

Step 5: Output a damage location and evaluate algorithm performance.

Step 5 specifically includes:
(1) Use peak point coordinates L ($x_i$, $y_i$) of $y_{MSPDI}$ as a damage location result for outputting.
(2) Use a Euclidean distance between the damage output L ($x_i$, $y_i$) and the true damage location D ($x_d$, $y_d$) as a positioning error Error. For m damage samples, $\overline{Error}$ is an average deviation, a mean absolute error MAE is defined to measure accuracy of an algorithm positioning capability, and a standard deviation STD is defined to measure stability of the positioning capability. An expression is as follows:

$$MAE = \frac{1}{m}\sum_{k=1}^{m} Error_k; \text{ and}$$

$$STD = \sqrt{\frac{1}{m}\sum_{k=1}^{m}(Error_k - \overline{Error})^2}.$$

In the solution in this embodiment, real-time detection is performed on damage that may occur in a structural member of the composite laminates in a service state. Therefore the solution has advantages of desirable real-time quality, high accuracy, strong robustness, and the like, and is of great significance to ensuring service safety of the structure. During specific application, a piezoelectric sensor array needs to be bonded to the to-be-detected structure, and the foregoing steps are performed successively, to achieve accurate positioning of structural damage of the composite laminates. When structural damage is found, an operation and maintenance engineer can rapidly position a damage part based on the obtained structural damage positioning result, make detailed damage evaluations, and carry out a corresponding repair policy based on a damage evaluation result (namely, a damage degree determining result). The repair policy includes the following content.

For slight damage, repair measures including filing, strengthening, or another repair method may be taken, to recover completeness and performance of the structure. For serious damage (for example, damage that cannot be repaired or is repaired undesirably), the affected component of the composite laminates is replaced, to ensure reliability of the entire structure. Specific operation regulations are subject to corresponding structure safety standards in the field.

In summary, according to the solution in this embodiment, after a specific damage location is obtained, the operation and maintenance engineer can carry out maintenance targetedly, so that excessive maintenance on the entire structure is avoided, and maintenance efficiency is improved. In addition, through timely damage detection and handling, service life of the structure of the composite laminates can be prolonged, maintenance costs can be reduced, and potential accident risks due to damage can be reduced. Moreover, analysis of damage positioning data can provide valuable experience for designs and fabrication processes in the future, so that structural designs are optimized, and a damage-resistance capability and endurance of the components of the composite laminates are improved.

Embodiment 2

This embodiment provides a probability multiply-sum structural damage imaging positioning system based on a delay factor.

The probability multiply-sum structural damage imaging positioning system based on the delay factor includes:
a numerical simulation unit, configured to obtain an optimal excitation frequency and a group-velocity theoretical correction function based on dispersion characteristic numerical simulation of composite laminates;
a data obtaining unit, configured to: based on the optimal excitation frequency, separately obtain ultrasonic guided wave response signals of the composite laminates in healthy and lossy states and sensor coordinates used for signal collection;
an effective path screening unit, configured to perform effective path screening based on the obtained ultrasonic guided wave response signals, a calculated result of a scattering energy parameter, and a preset threshold;
a damage delay factor obtaining unit, configured to: obtain, through fitting, a group-velocity correction function based on an actually measured group velocity obtained based on the ultrasonic guided wave response signal in the healthy state, calculate an actual delay time based on an obtained effective path, the group-velocity correction function, and the sensor coordinates, and obtain a damage delay factor based on the actual delay time and a reference delay time;
a damage imaging unit, configured to: form path probability distribution based on the damage delay factor, and perform a path probability multiply-sum operation to obtain a structural damage imaging result; and
a damage positioning unit, configured to obtain a structural damage positioning result based on peak point coordinates of the imaging result.

Further, the system in this embodiment is corresponding to the method in Embodiment 1. Technical details of the system are described in detail in Embodiment 1, and therefore are not described herein again.

In more embodiments:
an electronic device is provided, including a memory, a processor, and computer instructions stored in the memory and run on the processor. When the computer instructions are run on the processor, the method described in Embodiment 1 is implemented. For brevity, details are not described herein again.

It should be understood that in this embodiment, the processor may be a central processing unit CPU, or the processor may be another general purpose processor, a digital signal processor DSP, an application-specific integrated circuit ASIC, a field programmable gate array FPGA, another programmable logical device, a discrete gate, a transistor logic device, a discrete hardware component, or the like. The general purpose processor may be a microprocessor, or the processor may be any conventional processor or the like.

The memory may include a read-only memory and a random access memory, and provides instructions and data for the processor. A part of the memory may further include a non-volatile random access memory. For example, the memory may further store device type information.

In other embodiments, it is provided with:
a computer-readable storage medium, configured to store computer instructions. When the processor executes the computer instructions, the method described in Embodiment 1 is implemented.

The method in Embodiment 1 may be directly implemented by a hardware processor, or may be implemented by a combination of hardware in the processor and a software module. The software module may be located in a mature storage medium in the art, like a random access memory, a flash memory, a read-only memory, a programmable read-only memory, an electrically-erasable programmable memory, or a register. The storage medium is located in a memory, and the processor reads information from the memory and completes the steps in the foregoing method in combination with hardware of the processor. To avoid repetition, details are not described herein again.

A person of ordinary skill in the art can be aware that units and algorithm steps in the examples described with reference to embodiments can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of the present disclosure.

The probability multiply-sum structural damage imaging positioning method and system based on the delay factor that are provided in the foregoing embodiments can be implemented, and have broad application prospects.

The foregoing descriptions are merely preferred embodiments of the present disclosure, and are not intended to limit the present disclosure. A person skilled in the art can understand that the present disclosure may have various modifications and variations. Any modification, equivalent replacement, and improvement made without departing from the spirit and principle of the present disclosure shall fall within the protection scope of the present disclosure.

What is claimed is:

1. A probability multiply-sum structural damage imaging positioning method based on a delay factor, comprising:
    obtaining an optimal excitation frequency and a group-velocity theoretical correction function based on a dispersion characteristic numerical simulation of a composite laminate;
    based on the optimal excitation frequency, obtaining an ultrasonic guided wave response signal of the composite laminate in a healthy state and an ultrasonic guided wave response signal of the composite laminate in a lossy state, respectively, and sensor coordinates used for signal collection;
    performing effective path screening based on the obtained ultrasonic guided wave response signals, a calculated result of a scattering energy parameter, and a preset threshold;
    obtaining, through fitting, a group-velocity correction function based on an actually measured group velocity obtained based on the ultrasonic guided wave response signal of the composite laminate in the healthy state, and calculating an actual delay time based on an obtained effective path, the group-velocity correction function, and the sensor coordinates;
    obtaining a damage delay factor based on the actual delay time and a reference delay time;
    forming a path probability distribution based on the damage delay factor, and performing a path probability multiply-sum operation to obtain a structural damage imaging result; and
    obtaining a structural damage positioning result based on peak point coordinates of the imaging result; wherein
    effective path optimization: a path that comes near to damage usually presents stronger and more stable damage information and is referred to as an effective path, and a scattering energy parameter $E_0$ and a threshold $\alpha$ are defined to perform effective path screening;
    for an $i^{th}$ path, $c_i$ is a damage signal and is obtained by collecting the ultrasonic guided wave response signal of the composite laminate in the lossy state, $b_i$ is a health signal and is obtained by collecting the ultrasonic guided wave response signal of the composite laminate in the healthy state, a scattering energy parameter is $E_{oi}$, $E_{max}$ is maximum scattering energy among all paths, and $E_{min}$ is minimum scattering energy among all the paths, as shown in the following formulas:

$$E_i = \frac{\text{Energy}(c_i - b_i)}{\text{Energy}(b_i)}$$

and $$E_{oi} = \frac{E_i - E_{min}}{E_{max} - E_{min}} \geq \alpha;$$

calculation of the group-velocity correction function: obtaining two values of a wave packet peak time $t_{ph}$ and an excitation signal peak time $t_0$ of an $A_0$ modality of the health signal through Hilbert transform, calculating a difference between the two values to obtain a time of flight $t_h$ of the $A_0$ modality of the health signal, obtaining an anisotropic propagation velocity $c_g$ of guided waves based on a distance $d_s$ between an actuator and an initial sensor on the path, wherein $$c_g = \frac{d_s}{t_h},$$

and performing fitting on actually measured velocities of N paths by angle to obtain the group-velocity correction function which is denoted by $f(\theta)$;

calculation of the actual delay time: as regards a damage point D $(x_d, y_d)$ in an anisotropic material, for the $i^{th}$ path, performing back propagation on the guided waves from an actuator A $(x_{ai}, y_{ai})$ to a receiver R $(x_{ri}, y_{ri})$ through any reference point M $(x, y)$ in a plane, wherein a calculation formula of the actual delay time $t_{xi}$ is as follows:

$$t_{xi} = \frac{\sqrt{(x - x_{ai})^2 + (y - y_{ai})^2}}{c_{ga}} + \frac{\sqrt{(x - x_{ri})^2 + (y - y_{ri})^2}}{c_{gr}};$$

$$c_{ga} = f(\theta_a), \theta_a = \arctan\left(\frac{y - y_{ai}}{x - x_{ai}}\right); \text{ and}$$

$$c_{gr} = f(\theta_r), \theta_r = \arctan\left(\frac{y_{ri} - y}{x_{ri} - x}\right);$$

wherein $c_{ga}$ and $c_{gr}$ are respectively propagation velocities of the guided waves from the actuator to the point M and the guided waves from the point M to the receiver, $\theta_a$ is a group-velocity correction function from the actuator to the reference point M, $\theta_r$ is a group-velocity correction function from the point M to the receiver, the group-velocity correction function is denoted by $f(\theta)$, and a group velocity from the actuator to the reference point M is solved when $\theta=\theta_\alpha$, or a group velocity from the point M to the receiver is solved when $\theta=\theta_r$;

for the $i^{th}$ path, a calculation formula of a damage delay factor $\tau_{di}$ is $$\tau_{di} = \frac{t_{xi} - t_{si}}{t_{si}},$$

and $t_{si}$ is a time of flight of a scattering signal and is obtained by calculating a difference between a wave packet peak time $t_{psi}$ of an $A_0$ modality of the scattering signal on the path and the excitation signal peak time $t_0$;

a specific process of forming path probability distribution based on the damage delay factor is as follows: for the $i^{th}$ path, obtaining a damage probability distribution function $p_i(x, y) = C_{fi} \cdot W_i(x, y)$ at any reference point M $(x, y)$ in a grid, wherein $W_i(x, y)$ is a probability distribution function, and $c_{fi}$ is a weighting factor and is used to strengthen a damage degree of the damaged path; and the damage delay factor $\tau_{di}$ of the $i^{th}$ path is used in the probability distribution function $W_i(x,y)$, and an expression is $$W_i(x, y) = \begin{cases} 1 - \frac{1}{\beta} \cdot \tau_{di}, & \tau_{di} < \beta \\ 0 & \tau_{di} \geq \beta \end{cases},$$

wherein $\beta$ is a form factor of probabilistic diagnostic imaging.

2. The probability multiply-sum structural damage imaging positioning method based on the delay factor according to claim 1, wherein the obtaining a damage delay factor based on the actual delay time and a reference delay time is specifically obtaining a ratio of a difference between the actual delay time and the reference delay time to the reference delay time.

3. The probability multiply-sum structural damage imaging positioning method based on the delay factor according to claim 1, wherein the performing a path probability multiply-sum operation to obtain a structural damage imaging result is specifically:

$$y_{MSPDI} = \sum_{i=1}^{N-1} \sum_{j=i+1}^{N} p_{ij}(\tau_d)$$

$$p_{ij}(\tau_d) = \text{sign}(p_i(\tau_d)p_j(\tau_d)) \cdot \sqrt{|p_i(\tau_d)p_j(\tau_d)|};$$

wherein N is a quantity of paths, $\tau_d$ is the damage delay factor, $p_i(\tau_d)$ is a path probability distribution function with the damage delay factor used and is specifically a product of the weighting factor and the probability distribution function, and i and j are an it path and a $j^{th}$ path, respectively; and for the $j^{th}$ path, the probability distribution function $W_i(x, y)$ is specifically:

$$W_i(x, y) = \begin{cases} 1 - \frac{1}{\beta} \cdot \tau_{di}, & \tau_{di} < \beta \\ 0 & \tau_{di} \geq \beta \end{cases},$$

wherein $\beta$ is the form factor of the probabilistic diagnostic imaging.

4. The probability multiply-sum structural damage imaging positioning method based on the delay factor according to claim 1, wherein to avoid imaging artifacts existing in a one-time probability multiply-sum operation, a second-order probability multiply-sum operation is performed on a result of the path probability multiply-sum operation to obtain a structural damage imaging result.

5. The probability multiply-sum structural damage imaging positioning method based on the delay factor according to claim 1, wherein the obtaining the ultrasonic guided wave response signal of the composite laminate in the healthy state and the ultrasonic guided wave response signal of the composite laminate in the lossy state, respectively, and sensor coordinates used for signal collection, specifically comprise:

building an ultrasonic guided wave detection system comprising an annular sensor array on a to-be-detected composite laminate, and respectively obtaining the ultrasonic guided wave response signal of the composite laminate in the healthy state and the ultrasonic guided wave response signal of the composite laminate in the lossy state in a polling excitation mode based on the optimal excitation frequency.

6. The probability multiply-sum structural damage imaging positioning method based on the delay factor according to claim 5, wherein the polling excitation mode is specifically as follows: each sensor in the annular sensor array is used as an actuator, and remaining sensors are used as receivers to collect the ultrasonic guided wave response signals until all sensors are polled.

7. The probability multiply-sum structural damage imaging positioning method based on the delay factor according to claim 1, wherein the obtaining the optimal excitation frequency based on the dispersion characteristic numerical simulation of the composite laminate, specifically comprises: performing a numerical simulation based on property parameters of the composite laminate by using a dispersion calculator, to obtain a dispersion curve of the guided waves, obtaining a non-dispersion range of the guided waves based on the dispersion curve, and selecting, from the non-dispersion range, a frequency with a stable velocity and energy dissipation meeting a preset requirement as the optimal excitation frequency.

8. The probability multiply-sum structural damage imaging positioning method based on the delay factor according to claim 1, wherein a corresponding repair policy is carried out based on the structural damage positioning result and the damage degree, wherein the repair policy comprises: taking filing or strengthening repair measures for slight damage, or taking measures of replacing a corresponding component for serious damage.

9. An electronic device, comprising a memory, a processor, and a running computer program stored in the memory, wherein when the processor executes the program, the probability multiply-sum structural damage imaging positioning method based on the delay factor according to claim 1 is implemented.

10. A non-transitory computer-readable storage medium, wherein the medium stores a computer program, and when a processor executes the program, the probability multiply-sum structural damage imaging positioning method based on the delay factor according to claim 1 is implemented.

\* \* \* \* \*